Nov. 17, 1931.  R. F. KOHR  1,832,032
BRAKE
Filed April 11, 1928  2 Sheets-Sheet 1

INVENTOR.
Robert F. Kohr
BY P. W. Pomeroy
ATTORNEY

Nov. 17, 1931.       R. F. KOHR       1,832,032
BRAKE
Filed April 11, 1928    2 Sheets-Sheet 2

INVENTOR.
Robert F. Kohr
BY
P. W. Pomeroy
ATTORNEY

Patented Nov. 17, 1931

1,832,032

UNITED STATES PATENT OFFICE

ROBERT F. KOHR, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed April 11, 1928. Serial No. 269,060.

This invention relates to vehicle brakes and particularly to means for operating the same, the principal object being to provide a vehicle brake having an internal-expanding brake element with means for applying pressure to the brake element at a plurality of points around the circumference thereof to expand the same into engagement with the brake drum.

Another object is to provide a vehicle brake having a drum and an expandible brake element engageable therewith with a plurality of pivotally interconnected links engaging the brake element at their connections and with means for causing the links to change their relative angular positions for exerting a plurality of pressures against the brake element to expand the same into engagement with the brake drum.

A further object is to provide a vehicle brake with a brake element comprising an internal-expanding band having a plurality of spaced brackets secured thereto, and with an operating mechanism for the brake element comprising a plurality of links pivotally interconnected, the pins connecting each adjacent pair of links being received by and slidable in elongated openings provided in the brackets whereby movement of the links causes a plurality of radial pressures to be exerted against the brackets for expanding the brake element into engagement with the brake drum.

These being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a section through the left rear brake of a motor vehicle wheel taken just inside the head of the brake drum showing the brake element and operating mechanism in elevation.

Figure 1:
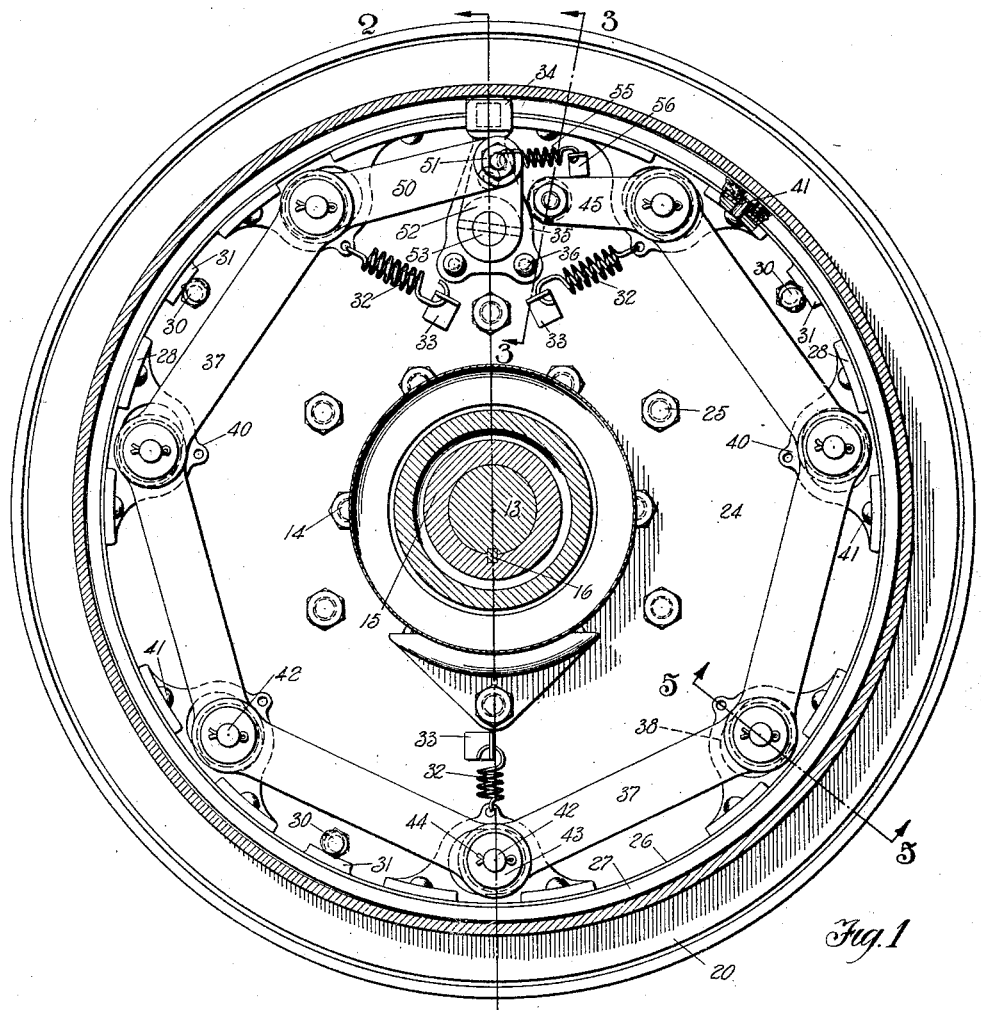

Referring to the accompanying drawings in which like numerals refer to like parts throughout the several views, the rear axle housing 10 is enlarged to receive a concentric casting 11 which carries a roller bearing 12 that rotatably supports the outer end of the rear axle shaft 13, the casting 11 being secured to the housing 10 by suitable bolts 14. The rear axle shaft 13 projects beyond the casting 11 and receives a wheel hub 15 which is held against rotation thereon by a key 16 and is held against longitudinal movement thereon by a nut 17 threaded on the end of the shaft 13. The hub 15 is formed with a flange 18 upon which the vehicle wheel 19 and brake drum 20 are concentrically mounted. Bolts 21 having nuts 22 threaded thereon secure the wheel 19 and drum 20 to the hub flange 18. The enlarged end of the rear axle housing 10 is provided with a flange 23 to which a dust cover or backing plate 24 is secured by bolts 25. The backing plate 24 is concentric with and is positioned as close as possible to the brake drum 20 in order to exclude dirt and foreign particles from the brake mechanism to prevent needless wear of the same.

Figures 2, 3:
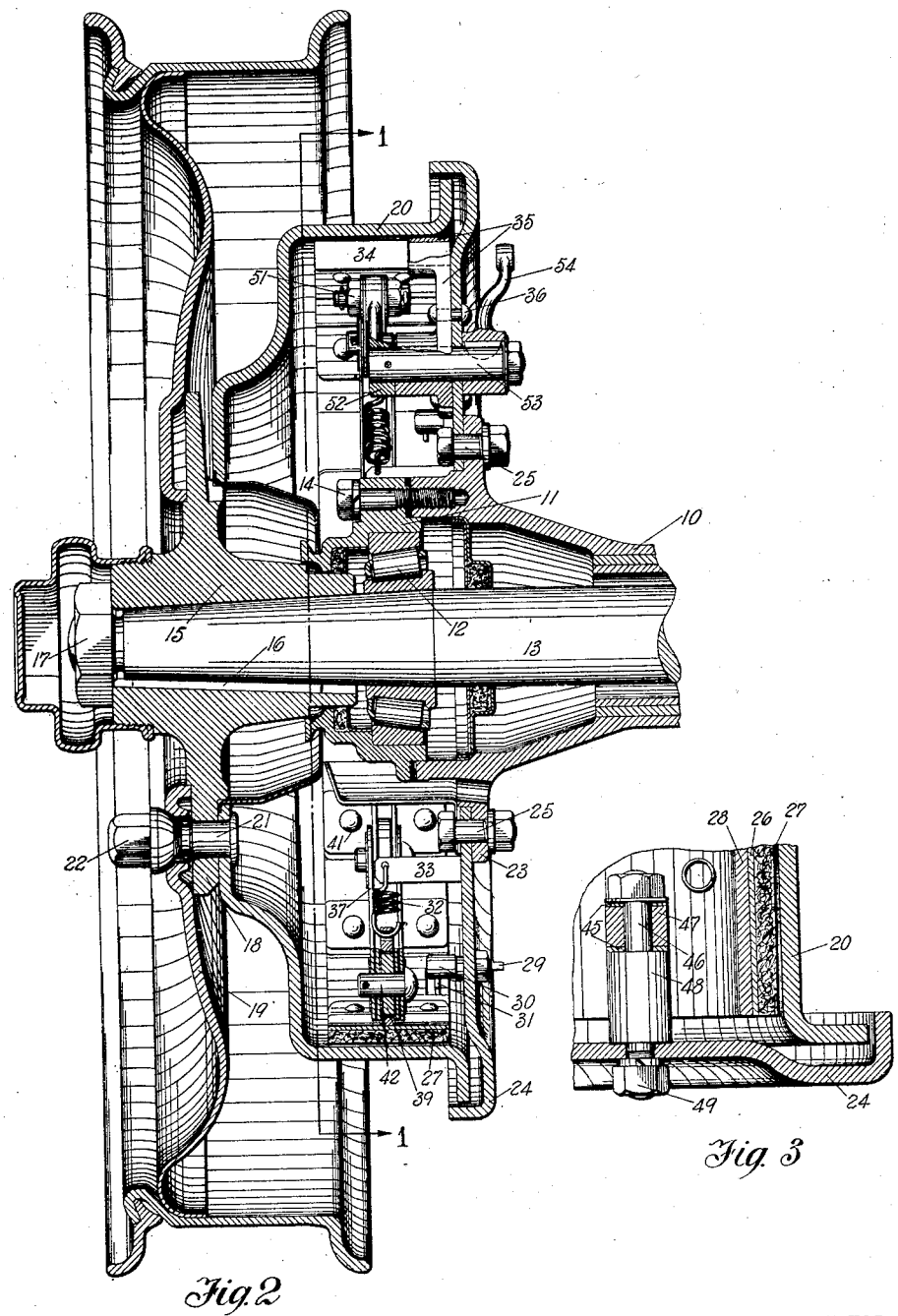
Figure 2 is a transverse section of the brake taken on the line 2—2 of Figure 1.
Figure 3 is a section taken on the line 3—3 of Figure 1 showing the method of anchoring the brake element operating mechanism.

As shown in Figures 1 and 2 the brake element is positioned concentrically within the drum 20 and comprises a flexible split band 26 having friction facing 27 secured thereto in a conventional manner. Seven spaced brackets 28 are secured by rivets 41 at spaced intervals to the band 26 around the circumference thereof, two of these brackets being positioned adjacent the free ends of the band 26. Adjustment of the band 26 is provided for by three spaced bolts 29 extending through the backing plate 24 which have eccentric cylindrical portions 30 that engage ears 31 struck radially inwardly from the metal of the band 26. The proper clearance between the brake drum 20 and band facing 27 is obtained by rotating the bolts 29.

The band 26 is held in normal position out of engagement with the brake drum 20 by coil springs 32 hooked through L-shaped stampings 33 welded or otherwise secured to the backing plate 24, two of the springs 32 being attached to the end brackets 28 and the other being attached to the bracket 28 diametrically opposite the free ends of the band 26. The last mentioned spring 32 draws the band 26 upwardly out of engagement with the drum 20 and into engagement with the adjacent adjusting member 20 and the other two springs 32 draw the free ends of the band inwardly out of contact with the drum 20 into contact with the adjusting eccentrics 30, and also draw the ends thereof into engagement with opposite sides of a stop member 34. This stop member 34 is formed as an extension of a bracket 35 which is secured by rivets 36 or other suitable means to the inner face of the backing plate 24. The use of this bracket 35 will presently be described in detail.

Figures 4, 5:
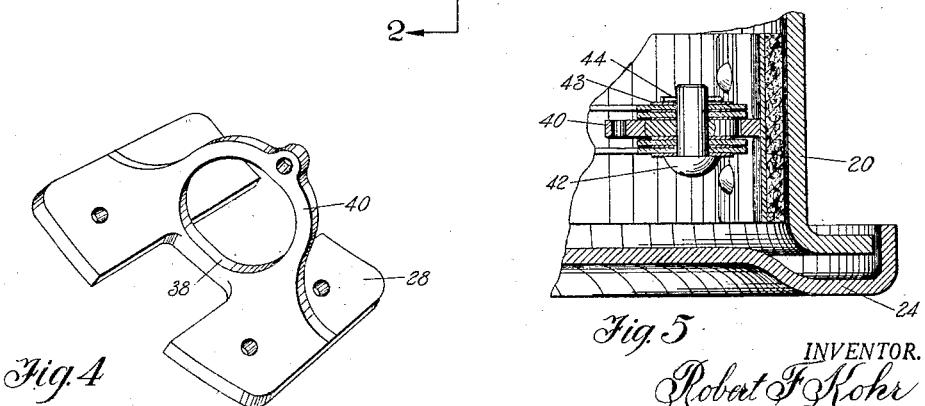
Figure 4 is an enlarged perspective view of one of the brake element brackets.
Figure 5 is a section taken on the line 5—5 of Figure 1 showing the means of interconnecting the operating links.

The object of this invention is to provide an operating mechanism for the brake element which will apply a radial pressure to each of the brackets 28 in such a manner that the band 26 will be expanded into engagement with the brake drum 20 and will have equal engagement therewith at all points around its circumference. This is accomplished in the present invention by the use of a plurality of links 37 arranged in pairs, each pair being pivoted at their ends to adjacent pairs. The web 40 of each T-shaped bracket 28 is formed with an elongated opening 38 within which a roller 39 is loosely positioned. One pair of links 37 is positioned so that it straddles the web 40 of the T-shaped bracket 28 and an adjacent pair of links is positioned to straddle the first-mentioned pair of links as shown in Figure 5. A pin 42 extends through the ends of the four links 37 and through the roller 39 positioned in the elongated opening 38 of the bracket 28. Washers 43 may be positioned between all the contacting parts as shown in Figure 5 and a cotter pin 44 is passed through the pin 42 to hold the parts in assembled relationship. The ends of all the links 37 are pivotally interconnected in this manner to the brackets 28 so that all the brackets 28 are interconnected as shown in Figure 1.

The bracket 28 adjacent one end of the band 26 is provided with a pair of shorter links 45 which are anchored by a bolt 46 secured to the backing plate 24, suitable spacers 47 and 48 being respectively provided between the links themselves and between the links 45 and backing plate 24 to hold the links 37 in correct transverse position. A nut 49 threaded on the bolt 46 secures the same to the backing plate 24.

The bracket 28 adjacent the other free end of the band 26, is also provided with a pair of shorter links 50 which are pivoted at their free ends to a bolt 51 extending through the end of an operating lever 52. The operating lever 52 is preferably secured to a rotatable shaft 53 journaled within the main portion of the bracket 35 and is provided with an arm 54 at its outer end connected with a brake foot pedal or hand lever (not shown). A coil spring 55 connected at one end to the lever bolt 51 and connected at the other end to a L-shaped stamping 56 welded or otherwise secured to the backing plate 24 normally holds the operating links in inoperative position.

Braking of the drum 20 is produced by changing the relative angular position of adjacent pairs of links 37. This change in the relative angular positions of the links 37 is accomplished by rotating the shaft 53 in a counter-clockwise direction to move the lever 52. The lever 52 moves the links and causes them to pivot about their connecting pins 42 which moves the pins 42 outwardly in a radial direction so that the rollers 39 carried thereby exert a radial force against each of the brackets 28. These radial forces are distributed to the band 26 at regular intervals around its inner circumference and which causes the band to expand equally in all directions into engagement with the rotating brake drum 20 to retard the rotation of the same. The rollers 39 move in the elongated openings 38 during movement of the links 37 and expansion of the band 26. One end of the band 26 moves away from the stop member 34 and the other end thereof remains in contact with the stop member 34 during expansion of the same.

The end of the band 26 which is moved away from the stop member 34 is of course, governed by the direction of rotation of the brake drum 20. As soon as the brake pressure is released the coil spring 55 retracts the links 50 and consequently moves the links 37 in a circumferential direction which allows the coil springs 32 to draw the band 26 out of engagement with the brake drum to normal inoperative position.

It is evident that because of the fact that expanding forces are exerted against the brake element in a plurality of radial directions, and this, through rollers 39, that direction of rotation of the drum 20 will not in any way affect the efficiency of the brake. The brake therefore, is as effective when a vehicle having these brakes incorporated thereon is moving in a rearward direction as when it is moving in a forward direction. It is evident that it is very advantageous to have a vehicle equipped with brakes which operate in the manner just described.

While I have described the brake operating mechanism as comprising seven sets of levers, it is to be understood that any desired number may be used and that any number of springs may be used to return the brake band to inoperative position. It is also to be understood that other formal changes may be made in the specific embodiment of the invention described without departing from the spirit and substance of the broad invention, the scope of which is commensurate with the appended claims.

What I claim is:

1. In a brake mechanism, a rotatable drum, a band expandible to engage the same, spaced brackets secured to said band, a plurality of pivoted links pivotally connected at their ends slidably engaging said brackets, and means for changing the relative angular positions of said links to exert a plurality of radial forces against said brackets for expanding said bands into engagement with said drum.

2. In a brake mechanism, a rotatable drum, a band expandible to engage the same, spaced brackets secured to the inner circumference of said band, a plurality of links pivoted together interconnecting said brackets and having slidable engagement therewith, and means for changing the relative angular positions of said links to exert a plurality of forces against said brackets for expanding said band into engagement with said drum.

3. In a brake mechanism, a rotatable drum, a band movable to engage the same, spaced brackets secured to the inner circumference of said band having vertical ribs provided with elongated openings, pivoted links interconnecting said brackets having their pivotal connections slidably received in said openings, and means connected with one of said links for moving said links to exert a plurality of forces against said brakes for expanding said band into engagement with said drum.

4. In a brake mechanism, a rotatable drum, a band movable into engagement therewith, spaced brackets secured to said band having radial ribs provided with elongated openings, pairs of links positioned each side of said ribs, pins pivotally connecting the ends of adjacent pairs of said links with said rollers to interconnect said brackets, and means connected with one pair of said links for moving said rollers in said openings to exert a plurality of radial forces against said brackets for moving said band into engagement with said drum.

5. In a brake mechanism, a rotatable drum, a band expandible into engagement therewith, spaced brackets secured to said band, pivotally interconnected links slidable in slots formed in said brackets, means for anchoring said interconnected links at one end, and means at the other end of said interconnected links for moving said links in said slots to change the angularity between the same for exerting radial forces against said brackets whereby said radial forces expand said band into engagement with said drum.

6. In a brake mechanism, a rotatable drum, a band expandible into engagement therewith, spaced brackets secured to said band, pivotally interconnected links slidable in said brackets, a lever at one end of said links movable to change the angularity therebetween to exert radial forces against said brackets for expanding said band into engagement with said drum, spring means for retracting said interconnected links, and spring means for returning said band to normal inoperative position.

7. In a brake mechanism, a rotatable drum, a backing plate adjacent to said drum, a band movable to engage said drum, spaced brackets secured to said band, interconnected links having shiftable pivots slidably engageable with said brackets, an anchor pin secured to said backing plate for anchoring said interconnected links at one end, a shaft rotatably carried by said backing plate, and a lever actuated by said shaft pivotally connected with the other end of said interconnected links whereby movement of said lever by said shaft causes said links to exert a plurality of radial forces against said brackets for expanding said band into engagement with said drum.

8. In a brake mechanism having a drum and a brake element within said drum, operating mechanism for moving said element into engagement with said drum comprising spaced T-shaped brackets secured to said brake element, each being provided with an elongated opening, a series of pivotally interconnected links adjacent to the outer sides of the webs of said brackets, a series of pivotally interconnected links adjacent to the inner sides of said webs, the pivot pins connecting adjacent links of one of said series being extended through said openings in said brackets to pivotally connect adjacent links of the other of said series of links, and a lever connected with the other adjacent ends of said series of links for moving the same to cause the pivot pins to exert a plurality of radial forces against said brackets.

9. In a brake mechanism, a rotatable drum, a brake element expandible to engage the same, spaced brackets secured to said element, a plurality of interconnected members pivotally supported solely by said brackets, and means for changing the relative angular positions of said members to exert a plurality of forces against said brake element to expand the same into engagement with said drum.

10. In a brake mechanism, a rotatable drum, a brake element movable to engage the same, spaced brackets secured to said element, a plurality of pivotally connected members having slidable pivots engageable with said brackets, and means for changing the relative angular positions of said members to exert a plurality of forces against said brake element to move the same into engagement with said drum.

Signed by me at South Bend, Indiana, this 9th day of April, 1928.

ROBERT F. KOHR.